United States Patent Office 3,758,469
Patented Sept. 11, 1973

3,758,469
s-TRIAZINES
Julius Diamond, Lafayette Hill, Pa., assignor to William H. Rorer, Inc., Fort Washington, Pa.
No Drawing. Filed Oct. 14, 1971, Ser. No. 189,405
Int. Cl. C07d 55/20
U.S. Cl. 260—249.9         50 Claims

ABSTRACT OF THE DISCLOSURE

Novel 2-amino-4-anilino - 6 - substituted 1,3,5-triazines, processes for preparing the same and their method of treatment of hypertension as medicinal agent are described. The compounds of this invention are useful in the treatment of gastrointestinal hyperacidity and ulceration. These compounds also have utility as antihypertensive agents.

SUMMARY OF THE INVENTION

This invention describes novel 2-amino-4-anilino-6-substituted 1,3,5-triazines, processes for preparing the same and their method of treatment as medicinal agents. The disclosed 2-amino-4-anilino-6-substituted-1,3,5 - triazines of this invention are useful in treating gastrointestinal hyperacidity and ulceration. Further, these triazines have utility as antihypertensive agents. When the compounds of this invention are administered to mammals they afford significant relief for gastrointestinal hyperacidity and ulceration and for hypertension disorders.

BACKGROUND OF THE INVENTION

The pharmaceutical compositions which have been used as antisecretory and spasmolytic agents have been such as atropine, homatropine, propantheline bromide, dicyclomine hydrochloride and other compounds which are structurally dissimilar to the triazines of this invention. Due to the anticholinergic properties of these known compounds, they produce undesirable side effects such as mydriasis, xerostomia, cyclopegia and other unwanted effects.

I have unexpectedly found that 2-amino-4-anilino-6-substituted-1,3,5-triazine compounds have valuable pharmacological properties.

I have found 2-amino-4-anilino-6-substituted-1,3,5-triazines which possess useful gastric, anti-secretory and spasmolytic and antiulcerogenic properties.

I have further found that the 2-amino-4-anilino-6-substituted-1,3,5-compounds of this invention are substantially void of the anticholinergic side effects which accompany heretofore known gastric antisecretory and spasmolytic agents.

I have found a simple and effective method for treating gastric hyperacidity and gastrointestinal ulceration such as duodenal and peptic ulceration.

I have found that the 2-amino-4-anilino-6-substituted-1,3,5-triazines of this invention possess useful antihypertensive properties.

I have again found that these 2-amino-4-anilino-6- substituted-1,3,5-triazine compounds are novel and conveniently synthesized.

DESCRIPTION AND PREFERRED EMBODIMENT

This invention comprises a class of novel chemical compounds which contain an anilino radical which is attached to the 4-position of a 2-amino-6-substituted-1,3,5-triazine ring.

This invention also described a new method of treating gastrointestinal disorders and diseases and gastrointestinal therapeutical compositions which comprises the administration of a compound having the structural formula as shown in Figure I.

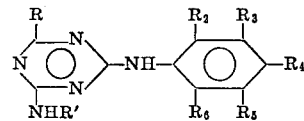

1 where:

$R_2$, $R_3$, $R_4$, $R_5$ and $R_6$ may be the same or different and are hydrogen, halo, loweralkyl, nitro, amino, acylamino, mono- and diloweralkylamino, cyano, haloloweralkyl, haloloweralkoxy, loweralkoxy, hydroxy, carboxy, carbloweralkoxy, sulfonamido, diloweralkylsulcloloweralkenylloweralkyl, haloloweralkyl, hydroxydiloweralkylsulfonamido, phenoxy, halophenoxy, acyloxy, phenyl, halophenyl, loweracyl, mercapto, loweralkylthio, loweralkylsulfinyl, loweralkylsulfonyl, acylthio, thiocyanato;

R is loweralkyl, loweralkenyl, loweralkynyl, cycloloweralkyl, cycloloweralkenyl, cycloloweraykyloweralkyl, cycloloweralkenylloweralkyl, haloloweralkyl, hydroxyloweralkyl or loweralkoxylloweralkyl; and R' is hydrogen or

and their non-toxic addition salts.

The more preferred compounds for a method of treating gastrointestinal disorders and diseases and for use in gastrointestinal therapeutic compositions embrace those compounds of structural Formula 1 where:

$R_2$, $R_3$, $R_4$, $R_5$ and $R_6$ may be the same or different and are hydrogen, halo, haloloweralkyl or nitro;

R is loweralkyl, loweralkenyl or haloloweralkyl; and R' is hydrogen.

The most preferred compounds for a method of treating gastrointestinal disorders and diseases and for use in gastrointestinal therapeutic compositions embrace those compounds of structural Formula 1 where:

$R_2$, $R_3$, $R_4$, $R_5$ and $R_6$ may be the same or different and are hydrogen, chloro, bromo, fluoro or trifluoromethyl;

R is methyl, ethyl, propyl, i-propyl, butyl, i-butyl, sec-butyl, t-butyl, pentyl, hexyl, allyl, methallyl, propargyl, monohalomethyl, dihalomethyl, trihalomethyl, haloethyl or halopropyl; and R' is hydrogen.

In the descriptive portions of this invention, the following definitions apply:

The term "lower alkyl" refers to an alkyl hydrocarbon group containing from 1 to about 8 carbon atoms which may be straight chained or branched.

The term "acyl" radical may be any organic radical derivative from an organic acid by its removal of the hydroxyl group such as acetyl, propionyl, benzoyl, etc. A "lower acyl" radical would contain up to about 8 carbon atoms.

The "loweralkoxy" radical signifies an alkoxy group containing from 1 to about 6 carbon atoms which may be straight chained or branched.

The term "loweralkenyl" refers to an alkenyl hydrocarbon group containing from 2 to about 8 carbon atoms which may be straight chained or branched.

The "loweralkynyl" radicals refer to an alkynyl hydrocarbon group containing from 2 to about 8 carbons which may be straight chained or branched.

This invention also describes novel chemical compounds which are generically described by the structural formula as shown in FIG. II:

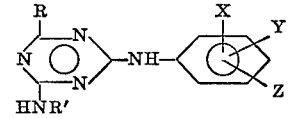

where:

X, Y and Z may be substituted at any position on the ring and

X is hydrogen, fluoro, chloro, bromo, iodo or haloloweralkyl;

Y is hydrogen, loweralkyl, halo, nitro, haloloweralkyl, haloloweralkoxy, cyano or loweralkylsulfonyl;

Z is haloloweralkyl, haloloweralkoxy, loweralkylsulfonyl, fluoro, iodo, bromo (provided at least one of X, Y and R' is other than hydrogen) or chloro (provided X or R' is other than hydrogen) and when Z is 3-chloro then X is other than 4-chloro when Y and R' are hydrogen;

R is loweralkyl, loweralkenyl, cycloloweralkyl, cycloloweralkylloweralkyl, haloloweralkyl or loweralkoxyloweralkyl; and R' is hydrogen or

The more preferred compounds of Formula II are described where:

Y is hydrogen, fluoro, chloro or bromo;

Z is trifluoromethyl, fluoro, bromo (provided at least one of X, Y and R' is other than hydrogen) or chloro (provided X or R' is other than hydrogen and when Z is 3-chloro then X is other than 4-chloro when Y and R' are hydrogen;

R is methyl, ethyl, propyl, i-propyl, butyl, i-butyl, sec-butyl, t-butyl, pentyl, hexyl, allyl, methallyl, propargyl, monohalomethyl, dihalomethyl, trihalomethyl, haloethyl or halopropyl; and R' is hydrogen.

It is well known in the pharmacological arts that non-toxic acid addition salts of pharmacologically active amine compounds do not differ in activities from their free base. The salts merely provide a convenient solubility factor. The amines of this invention may be readily converted to their non-toxic acid addition salts by customary methods in the art. The non-toxic salts of this invention are those salts the acid component of which is pharmacologically acceptable in the intended dosages; such salts would include those prepared from inorganic acids, organic acids, higher fatty acids, high molecular weight acids, etc., and include such as:

hydrochloric acid,
hydrobromic acid,
sulfuric acid,
nitric acid,
phosphoric acid,
methane sulfonic acid,
benzene sulfonic acid,
acetic acid,
propionic acid,
malic acid,
succinic acid,
glycolic acid,
lactic acid,
salicylic acid,
benzoic acid,
nicotinic acid,
phthalic acid,
stearic acid,
oleic acid,
abietic acid, etc.

Representative compounds of this invention which are particularly useful are as follows:

2-amino-6-ethyl-4-anilino-1,3,5-triazine
2-amino-6-ethyl-4-(o-chloroanilino)-1,3,5-triazine
2-amino-6-ethyl-4-(m-chloroanilino)-1,3,5-triazine
2-amino-6-ethyl-4-(p-chloroanilino)-1,3,5-triazine
2-amino-6-ethyl-4-(2,3-dichloroanilino)-1,3,5-triazine
2-amino-6-ethyl-4-(2,4-dichloroanilino)-1,3,5-triazine
2-amino-6-ethyl-4-(2,5-dichloroanilino)-1,3,5-triazine
2-amino-6-ethyl-4-(2,6-dichloroanilino)-1,3,5-triazine
2-amino-6-ethyl-4-(3,4-dichloroanilino)-1,3,5-triazine
2-amino-6-ethyl-4-(3,5-dichloroanilino)-1,3,5-triazine
2-amino-6-ethyl-4-(2,3,4-trichloroanilino)-1,3,5-triazine
2-amino-6-ethyl-4-(2,3,5-trichloroanilino)-1,3,5-triazine
2-amino-6-ethyl-4-(2,3,6-trichloroanilino)-1,3,5-triazine
2-amino-6-ethyl-4-(2,4,5-trichloroanilino)-1,3,5-triazine
2-amino-6-ethyl-4-(2,4,6-trichloroanilino)-1,3,5-triazine
2-amino-6-ethyl-4-(3,4,5-trichloroanilino)-1,3,5-triazine
2-amino-6-ethyl-4-(p-bromoanilino)-1,3,5-triazine
2-amino-6-ethyl-4-(o-fluoroanilino)-1,3,5-triazine
2-amino-6-ethyl-4-(m-fluoroanilino)-1,3,5-triazine
2-amino-6-ethyl-4-(p-fluoroanilino)-1,3,5-triazine
2-amino-6-ethyl-4-(p-iodoanilino)-1,3,5-triazine
2-amino-6-ethyl-4-(p-methylanilino)-1,3,5-triazine
2-amino-6-ethyl-4-(p-nitroanilino)-1,3,5-triazine
2-amino-6-ethyl-4-(p-aminoanilino)-1,3,5-triazine
2-amino-6-ethyl-4-(p-acetylaminoanilino)-1,3,5-triazine
2-amino-6-ethyl-4-(p-methylaminoanilino)-1,3,5-triazine
2-amino-6-ethyl-4-(p-dimethylaminoanilino)-1,3,5-triazine
2-amino-6-ethyl-4-(p-cyanoanilino)-1,3,5-triazine
2-amino-6-ethyl-4-(o-trifluoromethylanilino)-1,3,5-triazine
2-amino-6-ethyl-4-(m-trifluoromethylanilino)-1,3,5-triazine
2-amino-6-methyl-4-(p-trifluoromethylanilino)-1,3,5-triazine
2-amino-6-ethyl-4-(p-trifluoromethoxyanilino)-1,3,5-triazine
2-amino-6-ethyl-4-(p-methoxyanilino)-1,3,5-triazine
2-amino-6-ethyl-4-(p-hydroxyanilino)-1,3,5-triazine
2-amino-6-ethyl-4-(p-carboxyanilino)1,3,5-triazine
2-amino-6-ethyl-4-(p-carbethoxyanilino)-1,3,5-triazine
2-amino-6-ethyl-4-(p-sulfonamidoanilino)-1,3,5-triazine
2-amino-6-ethyl-4-(p-dimethylsulfonamidoanilino)-1,3,5-triazine
2-amino-6-ethyl-4-(p-trifluoroacetylanilino)-1,3,5-triazine
2-amino-6-ethyl-4-(p-trifluoromethylsulfonylanilino)-1,3,5-triazine
2-amino-6-ethyl-4-(p-di-trifluoromethylsulfonamidoanilino)-1,3,5-triazine
2-amino-6-ethyl-4-(p-phenoxyanilino)-1,3,5-triazine
2-amino-6-ethyl-4-(p-[p'-chlorophenoxy] anilino)-1,3,5-triazine
2-amino-6-ethyl-4-(p-acetoxyanilino)-1,3,5-triazine
2-amino-6-ethyl-4-(p-biphenylylanilino)-1,3,5-triazine
2-amino-6-ethyl-4-(p-[4'-chlorobiphenylyl] anilino)-1,3,5-triazine
2-amino-6-ethyl-4-(p-acetylanilino)-1,3,5-triazine
2-amino-6-ethyl-4-(p-mercaptoanilino)-1,3,5-triazine
2-amino-6-ethyl-4-(p-methylthioanilino)-1,3,5-triazine
2-amino-6-ethyl-4-(p-methylsulfinylanilino)-1,3,5-triazine
2-amino-6-ethyl-4-(p-methylsulfonylanilino)-1,3,5-triazine
2-amino-6-ethyl-4-(p-acetylthioanilino)-1,3,5-triazine
2-amino-6-ethyl-4-(p-thiocyanatoanilino)-1,3,5-triazine
2-amino-6-ethyl-4-(2,3-difluoroanilino)-1,3,5-triazine
2-amino-6-ethyl-4-(2,4-difluoroanilino)-1,3,5-triazine
2-amino-6-ethyl-4-(2,5-difluoroanilino)-1,3,5-triazine
2-amino-6-ethyl-4-(2,6-difluoroanilino)-1,3,5-triazine
2-amino-6-ethyl-4-(3,4-difluoroanilino)-1,3,5-triazine
2-amino-6-ethyl-4-(3,5-difluoroanilino)-1,3,5-triazine
2-amino-6-ethyl-4-(2-cyano-4-chloroanilino)-1,3,5-triazine
2-amino-6-ethyl-4-(2-trifluoromethyl-4-fluoroanilino)-1,3,5-triazine
2-amino-6-ethyl-4-(2-trifluoromethyl-4-chloroanilino)-1,3,5-triazine
2-amino-6-ethyl-4-(2-trifluoromethyl-4-bromoanilino)-1,3,5-triazine
2-amino-6-ethyl-4-(2-trifluoromethyl-4-nitroanilino)-1,3,5-triazine
2-amino-6-ethyl-4-(3-trifluoromethyl-4-fluoroanilino)-1,3,5-triazine 2-amino-6-ethyl-4-(3-trifluoromethyl-4-chloroanilino)-1,3,5-triazine
2-amino-6-ethyl-4-(3-trifluoromethyl-4-bromoanilino)-1,3,5-triazine
2-amino-6-ethyl-4-(3-trifluoromethyl-4-nitroanilino)-1,3,5-triazine
2-amino-6-ethyl-4-(4-trifluoromethyl-2-fluoroanilino)-1,3,5-triazine
2-amino-6-ethyl-4-(4-trifluoromethyl-2-chloroanilino)-1,3,5-triazine
2-amino-6-ethyl-4-(4-trifluoromethyl-2-bromoanilino)-1,3,5-triazine
2-amino-6-ethyl-4-(4-trifluoromethyl-2-nitroanilino)-1,3,5-triazine
2-amino-6-ethyl-4-(4-trifluoromethyl-3-fluoroanilino)-1,3,5-triazine
2-amino-6-ethyl-4-(4-trifluoromethyl-3-chloroanilino)-1,3,5-triazine
2-amino-6-ethyl-4-(4-trifluoromethyl-3-bromoanilino)-1,3,5-triazine
2-amino-6-ethyl-4-(4-trifluoromethyl-3-nitroanilino)-1,3,5-triazine
2-amino-6-ethyl-4-(2-fluoro-5-trifluoromethylanilino)-1,3,5-triazine
2-amino-6-ethyl-4-(2-chloro-5-trifluoromethylanilino)-1,3,5-triazine
2-amino-6-ethyl-4-(2-bromo-5-trifluoromethylanilino)-1,3,5-triazine
2-amino-6-ethyl-4-(2-nitro-5-trifluoromethylanilino)-1,3,5-triazine
2-amino-6-ethyl-4-(2-fluoro-4-chloroanilino)-1,3,5-triazine
2-amino-6-ethyl-4-(2-chloro-4-fluoroanilino)-1,3,5-triazine
2-amino-6-ethyl-4-(2-chloro-6-fluoroanilino)-1,3,5-triazine
2-amino-6-ethyl-4-(2,3-dibromoanilino)-1,3,5-triazine
2-amino-6-ethyl-4-(2,5-dibromoanilino)-1,3,5-triazine
2-amino-6-ethyl-4-(2,6-dibromoanilino)-1,3,5-triazine
2-amino-6-ethyl-4-(2,3,5,6-tetrafluoroanilino)-1,3,5-triazine
2-amino-6-ethyl-4-(2,3,4,5,6-pentafluoroanilino)-1,3,5-triazine
2-amino-6-ethyl-4-(2,6-dichloro-4-bromoanilino)-1,3,5-triazine
2-amino-6-ethyl-4-(2,6-dichloro-4-fluoroanilino)-1,3,5-triazine
2-amino-6-ethyl-4-(2,6-dichloro-4-iodoanilino)-1,3,5-triazine
2-amino-6-ethyl-4-(2,6-dichloro-4-nitroanilino)-1,3,5-triazine
2-amino-6-ethyl-4-(2,6-dichloro-4-trifluoromethylanilino)-1,3,5-triazine
2-amino-6-ethyl-4-(2,4-dichloro-6-bromoanilino)-1,3,5-triazine
2-amino-6-ethyl-4-(2-trifluoromethyl-4-aminoanilino)-1,3,5-triazine
2-amino-6-ethyl-4-(2-trifluoromethyl-4-acetylaminoanilino)-1,3,5-triazine
2-amino-6-ethyl-4-(4-amino-3-trifluoromethylanilino)-1,3,5-triazine
2-amino-6-ethyl-4-(4-dimethylamino-3-trifluoromethylanilino)-1,3,5-triazine
2-amino-6-ethyl-4-(3,5-ditrifluoromethylanilino)-1,3,5-triazine
2-amino-6-ethyl-4-(4-hydroxy-3-trifluoromethylanilino)-1,3,5-triazine
2-amino-6-ethyl-4-(2,4-dinitroanilino)-1,3,5-triazine
2-amino-6-ethyl-4-(4-methoxy-3-trifluoromethylanilino)-1,3,5-triazine
2-amino-6-ethyl-4-(3-trifluoromethyl-4-methoxyanilino)-1,3,5-triazine
2-amino-6-ethyl-4-(p-trifluoromethylanilino)-1,3,5-triazine 2-amino-6-propyl-4-(p-trifluoromethylanilino)-1,3,5-triazine
2-amino-6-i-propyl-4-(p-trifluoromethylanilino)-1,3,5-triazine
2-amino-6-butyl-4-(p-trifluoromethylanilino)-1,3,5-triazine
2-amino-6-i-butyl-4-(p-trifluoromethylanilino)-1,3,5-triazine
2-amino-6-sec-butyl-4-(p-trifluoromethylanilino)-1,3,5-triazine
2-amino-6-t-butyl-4-(p-trifluoromethylanilino)-1,3,5-triazine
2-amino-6-pentyl-4-(p-trifluoromethylanilino)-1,3,5-triazine
2-amino-6-hexyl-4-(p-trifluoromethylanilino)-1,3,5-triazine
2-amino-6-allyl-4-(p-trifluoromethylanilino)-1,3,5-triazine
2-amino-6-methallyl-4-(p-trifluoromethylanilino)-1,3,5-triazine
2-amino-6-propargyl-4-(p-trifluoromethylanilino)-1,3,5-triazine
2-amino-6-cyclopropyl-4-(p-trifluoromethylanilino)-1,3,5-triazine
2-amino-6-(2-cyclohexenyl)-4-(p-trifluoromethylanilino)-1,3,5-triazine
2-amino-6-cyclopropylmethyl-4-(p-trifluoromethylanilino)-1,3,5-triazine
2-amino-6-(cyclopen-2-enylmethyl)-4-(p-trifluoromethylanilino)-1,3,5-triazine
2-amino-6-chloromethyl-4-(p-trifluoromethylanilino)-1,3,5-triazine
2-amino-6-fluoromethyl-4-(p-trifluoromethylanilino)-1,3,5-triazine
2-amino-6-dibromomethyl-4-(p-trifluoromethylanilino)-1,3,5-triazine
2-amino-6-trifluoromethyl-4-(p-trifluoromethylanilino)-1,3,5-triazine
2-amino-6-dichlorofluoromethyl-4-(p-trifluoromethylanilino)-1,3,5-triazine
2-amino-6-pentafluoromethyl-4-(p-trifluoromethylanilino)-1,3,5-triazine
2-amino-6-hydroxymethyl-4-(p-trifluoromethylanilino)-1,3,5-triazine
2-amino-6-methoxymethyl-4-(p-trifluoromethylanilino)-1,3,5-triazine
2-acetylamido-6-methyl-4-(p-trifluoromethylanilino)-1,3,5-triazine
2-propionamido-6-propyl-4-(p-trifluoromethylanilino)-1,3,5-triazine
2-butyramido-6-butyl-4-(p-trifluoromethylanilino)-1,3,5-triazine
2-cyclopropionamido-6-cyclopropyl-4-(p-trifluoromethylanilino)-1,3,5-triazine The compounds of this invention may be prepared by the following general procedures.

Condensation of a 1-substituted phenylbiguanide with an acid halide or acid anhydride in the presence of an inert solvent results in ring closure to the corresponding 2-acylamino-6-R-4-anilino-1,3,5-triazine.

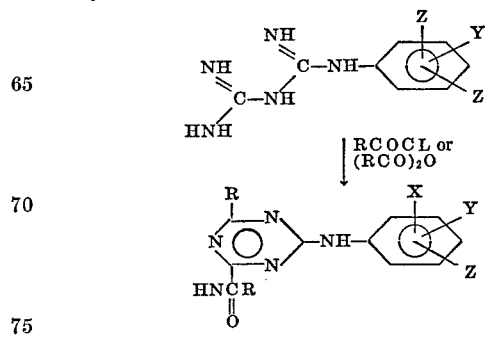

When the above acylating agent is replaced with an acid ester or amide then the product prepared is a 2-amino-6-R-4-anilino-1,3,5-triazine.

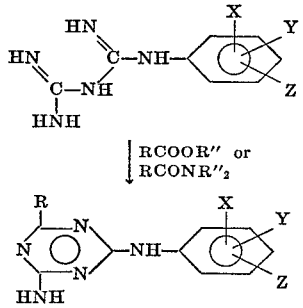

where R″ is loweralkyl.

The condensation reaction is normally carried out in the presence of an inert solvent and it is preferable to use a polar solvent such as methanol, ethanol, 2-ethoxyethanol, dimethylformamide, acetic acid etc. The reaction may also be carried out using an excess of the reactant as solvent. Reaction is preferably carried out using increased temperature. The biguanide may be present in the form of a salt. Isolation of the triazine product is by any method known in the art such as evaporating the reaction mixture to dryness, adding cold aqueous base and extracting or filtering the triazine product.

The biguanide compounds used as starting materials in this invention are either known compounds or they may be prepared by reaction of a cyanoguanide and an aniline in the presence of an equimolar amount of a mineral acid.

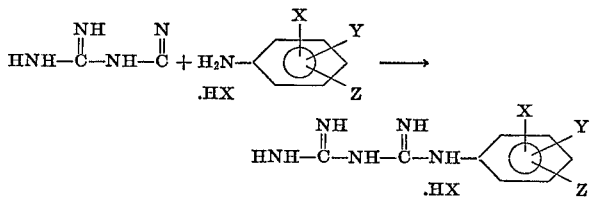

The polar medium may be aqueous, partially aqueous or non-aqueous and solvents such as dimethylsulfoxide, diethyleneglycol, tetrahydrofuran, dimethylformamide, etc. The reaction is usually carried out at raised temperatures and isolation is by any method known in the art.

Appropriately desired X, Y and Z substituents can be prepared at various stages of synthesis using suitable reaction in order to convert one group to another. Thus, for example, nitration of the anilide can be carried out to obtain ortho and/or para substitution with or without substituents present. This may then be reduced to an amine group which in turn may be diazotized followed by a Sandmeyer type reaction to yield chloro or bromo. The diazo compound may be converted to a cyano with cuprous cyanide; iodo with potassium iodide, a hydroxy or alkoxy with water or alcohol. The diazonium fluoroborate may also be formed and then thermally decomposed to the fluoro compound. The amine may also be mono- or dialkylated or acetylated. Halogenation may be carried out on the aniline to obtain ortho and/or para chloro, bromo or iodo substituents. The chloro, bromo or iodo compound may then be treated with cuprous cyanide to obtain the cyano compound. The chloro or bromo compound may be reacted with trifluoromethyliodide and copper powder at about 150° C. to obtain the trifluoromethyl. Reaction of the chloro or bromo with methane sulfinate in quinoline at about 150° C. results in the methylsulfonyl.

When substitution is desired in the meta position, nitration or halogenation may be carried out on an acetophenone. The resulted meta substituted compound may then be converted to the oxime and treated under Beckmann rearrangement conditions to the acetanilide.

In an analogous manner other reactions known in the art may also be employed and further methods are described in the examples.

I have found that the compounds of this invention have an effective degree of gastric anti-secretory activity and effectively reduce the volume and the acidity of the gastric fluid in humans and mammals. Still further, these compounds produce a considerable spasmolytic action on the gastrointestinal musculature, i.e., they reduce the peristaltic action of the gastrointestinal musculature which is manifested by a delay in gastric emptying time.

Until now, the known antiulcerogenic compounds which showed gastric antisecretory and gastrointestinal spasmolytic action have included such agents as atropine, homatropine, propantheline, dicyclomine, etc. These compounds, however, cause accompanying undesirable anticholinergic properties such as mydriasis, xerostomia, cyclopegia, etc. I have found that the 2-amino-4-anilino-6 - substituted - 1,3,5 - triazines of this invention are particularly useful as anti-secretory, anti-spasmodic and anti-ulcerogenic agents because they are essentially devoid of these unwanted effects.

In particular the triazines as herein described are useful in the treatment of such ulcerogenic disorders and diseases as duodenal ulcer and peptic ulcer.

I have also found that the 2-amino-4-anilino-6-substituted-1,3,5-triazine compounds of this invention are therapeutically useful for their anti-hypertensive properties. They provide significant reduction in hypertensive conditions and disorders and afford relief to associated organs affected by the hypertensive disease.

For all these purposes, the 2-amino-4-anilino-6-substituted-1,3,5-triazines of this invention can be normally administered orally or parenterally. Orally they may be administered as tablets, aqueous or oily suspension, dispersible powders or granules, emulsions, hard or soft capsules, or syrups or elixirs. The term parenteral as used herein, includes subcutaneous injection, intravenous, intramuscular or intrasternal injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation.

Further, these compounds may be tableted or otherwise formulated so that for every 100 parts by weight of the composition, there are present between 5 and 95 parts by weight of the active ingredient. The dosage unit form will generally contain between about 1 mg. and about 500 mg. of the active ingredients of this invention. The preferred unit dose is between about 10 mg. and about 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of ulcerogenic and hypertension disease conditions or symptoms. In general, the daily dose can be between about 0.1 mg./kg. and 70 mg./kg. (preferably in the range of 1–25 mg./kg./day), bearing in mind, of course, that in selecting the appropriate dosage in any specific case, consideration must be given to the patient's weight, general health, age and other factors which may influence response to the drug.

Various tests in animals have been carried out to show the ability of the compounds of this invention to exhibit reactions that can be correlated with anti-ulcerogenic activity in humans. These tests involve such as the effect of the 2-amino-4-anilino-6-substituted-1,3,5-triazines on gastric secretion, gastro-intestinal spasm and their mucogenic effect. It has been found that the compounds of this invention when tested in the above variety of situations show a marked activity.

One such test is the gastric secretion test. This test is carried out as follows: Shay rats are fasted for 4–8 hours, and water is given ad lib. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on dogs. This is outlined in the Handbook of Physiology, Section 6: Alimentary Canal, volume II: Secretion, American Physiology society, Washington, D.C., 1967.

It has been found that the compounds of this invention when subjected to the above gastric secretion tests display a marked ability to decrease gastric volume and gastric acidity. These tests are known to correlate well with gastric activity in humans and is a standard test used to determine anti-secretory properties.

To determine the anti-ulcer effectiveness the following test is employed: Male Wistar rats (130–150 grams) are fasted for 24 hours, then given reserpine at 5 mg./kg.i.p. Twenty-four hours later, the stomachs are removed and examined for ulceration. Ulcers are graded on 0–4 scale and the number of ulcers is recorded. Pretreatment with the triazine compounds of this invention produces a decrease in ulcer grade and the number of ulcers compared to the control reserpine-treated rats.

Determination of anti-spasmodic propreties can be carried out by the procedure as outlined by D. A. Brodie and S. K. Kundrats in their article entitled "Effect of Drugs on Gastric Emptying in Rats," Fed. Proc. 24:714 (1955).

The biguanides of this invention have also been found to be mucogenic agents, that is, they increase the biosynthesis of mucopolysaccharides of the gastric mucous membrane which is a mechanism for inhibiting gastrointestinal ulcer. This property is determined by the test outlined in the J. Pharm. Pharmac., 1970, 22, 143–4.

Mydriasis is detected by the procedure R. A. Turner, Screening Methods in Pharmacology, Academic Press, New York, and London, pp. 174–5, 1965. Acute toxicity is calculated according to the standard Litchfield-Wilcoxon procedure.

In view of the results of these tests, the pharmacological data clearly indicates that the 2-aamino-4-anilino-6-substituted-1,3,5-triazines of this invention can be considered to be effective anti-ulcerogenic agents having active gastric anti-secretory and anti-spasmodic properties which are substantially free of anti-cholinergic side effects and having a low toxicity.

Tests in animals may also be carried out to show the ability of the 2-amino-6-substituted-1,3,5-triazine compound of this invention to inhibit reactions that can be correlated with hypertensive effects in humans. One such test is outlined by Jacques de Champlain, Lawrence R. Krahoff and Julius Axelrod in Circulation Research XXIII: 479 (1968). This testing method is known to correlate well with hypertensive activity in humans and is a standard test used to determine antihypertensive properties. In view of the results of this test, the 2-amino-4-anilino-6-substituted-1,3,5-triazine compounds of this invention can be considered to be active anti-hypertensive agents.

The following are detailed examples which show the preparation of the compounds of this invention. They are to be construed as illustrations of said compounds and not as limitations thereof.

EXAMPLE 1

2-amino-6-ethyl-4-(p-trifluoromethylanilino)-1,3,5-triazine

A mixture of 5.1 g. (0.028 mole) of 1-(p-trifluoromethylphenyl)biguanide dissolved in 10 ml. of n-propanol and 4.1 ml. (0.0416 mole) of ethylpropionate is refluxed on a steam bath for 15 hours. The reaction mixture is then chilled and evaporated to dryness. The residue is recrystallized from dichloromethane/heptane mixture. This product is then dissolved in ether and extracted with 2×100 ml. of 25% acetic acid followed by 25 ml. of 10% sodium hydroxide solution and dried over sodium carbonate. Evaporation to dryness and recrystallization from isopropanol yields 2-amino-6-ethyl-4-(p-trifluoromethylanilino)-1,3,5-triazine.

When the above procedure is followed, however, the ethylpropionate is replaced by the reactants of Table I below, then the products of Table II below are prepared.

TABLE I ethylacetate
ethylbutyrate
ethylpentanoate
ethyl 3-methylbutanoate
ethyl hexanoate
ethyl 3-butenoate
ethyl 3-butynoate
ethyl cyclobutanecarboxylate
ethyl cyclopropylacetate
ethyl chloroacetate
ethyl trichloroacetate
ethyl fluorodichloroacetate
ethylpropionate
ethyl isobutyrate
ethyl 2-methylbutanoate
ethyl 2,2-dimethylpropionate
ethyl heptanoate
ethyl 2-methyl-3-butenoate
ethyl cyclopropanecarboxylate
ethyl cyclopentanecarboxylate
ethyl cyclohexylacetate
ethyl dichloroacetate
ethyl dibromoacetate
ethyl difluoroacetate
ethyl trifluoroacetate
ethyl 2-chloropropionate
ethyl methoxyacetate
ethyl 2-methoxypropionate
ethyl 2-bromopropionate
ethyl pentafluoropropionate
ethyl 3-methoxypropionate
ethyl 3-ethoxypropionate

TABLE II 2-amino-6-methyl-4-(p-trifluoromethylanilino)-1,3,5-triazine
2-amino-6-ethyl-4-(p-trifluoromethylanilino)-1,3,5-triazine
2-amino-6-propyl-4-(p-trifluoromethylanilino)-1,3,5-triazine
2-amino-6-i-propyl-4-(p-trifluoromethylanilino)-1,3,5-triazine
2-amino-6-butyl-4-(p-trifluoromethylanilino)-1,3,5-triazine
2-amino-6-i-butyl-4-(p-trifluoromethylanilino)-1,3,5-triazine
2-amino-6-sec-butyl-4-(p-trifluoromethylanilino)-1,3,5-triazine
2-amino-6-t-butyl-4-(p-trifluoromethylanilino)-1,3,5-triazine
2-amino-6-pentyl-4-(p-trifluoromethylanilino)-1,3,5-triazine
2-amino-6-hexyl-4-(p-trifluoromethylanilino)-1,3,5-triazine 2-amino-6-allyl-4-(p-trifluoromethylanilino)-
 1,3,5-triazine
2-amino-6-methallyl-4-(p-trifluoromethylanilino)-
 1,3,5-triazine
2-amino-6-propargyl-4-(p-trifluoromethylanilino)-
 1,3,5-triazine
2-amino-6-cyclopropyl-4-(p-trifluoromethylanilino)-
 1,3,5-triazine
2-amino-6-cyclobutyl-4-(p-trifluoromethylanilino)-
 1,3,5-triazine
2-amino-6-cyclopentyl-4-(p-trifluoromethylanilino)-
 1,3,5-triazine
2-amino-6-cyclopropylmethyl-4-(p-trifluoromethyl-
 anilino)-1,3,5-triazine
2-amino-6-cyclohexylmethyl-4-(p-trifluoromethyl-
 anilino)-1,3,5-triazine
2-amino-6-chloromethyl-4-(p-trifluoromethylanilino)-
 1,3,5-triazine
2-amino-6-dichloromethyl-4-(p-trifluoromethylanilino)-
 1,3,5-triazine
2-amino-6-trichloromethyl-4-(p-trifluoromethylanilino)-
 1,3,5-triazine
2-amino-6-dibromomethyl-4-(p-trifluoromethylanilino)-
 1,3,5-triazine
2-amino-6-fluorodichloromethyl-4-(p-trifluoromethyl-
 anilino)-1,3,5-triazine
2-amino-6-difluoromethyl-4-(p-trifluoromethylanilino)-
 1,3,5-triazine
2-amino-6-trifluoromethyl-4-(p-trifluoromethylanilino)-
 1,3,5-triazine
2-amino-6-α-bromoethyl-4-(p-trifluoromethylanilino)-
 1,3,5-triazine
2-amino-6-α-chloroethyl-4-(p-trifluoromethylanilino)-
 1,3,5-triazine
2-amino-6-pentafluoroethyl-4-(p-trifluoromethylanilino)-
 1,3,5-triazine
2-amino-6-methoxymethyl-4-(p-trifluoromethylanilino)-
 1,3,5-triazine
2-amino-6-(β-methoxyethyl-4-(p-trifluoromethyl-
 anilino)-1,3,5-triazine
2-amino-6-(α-methoxyethyl-4-(p-trifluoromethyl-
 anilino)-1,3,5-triazine
2-amino-6-(α-ethoxyethyl-4-(p-trifluoromethyl-
 anilino)-1,3,5-triazine

EXAMPLE 2

When the procedure of Example 1 is followed, however, 1-(p-trifluoromethylphenyl)biguanide is replaced by the starting materials below then the corresponding products are obtained.

STARTING MATERIALS 1-phenylbiguanide
1-(o-chlorophenyl)biguanide
1-(m-chlorophenyl)biguanide
1-(p-chlorophenyl)biguanide
1-(2,3-dichlorophenyl)biguanide
1-(2,4-dichlorophenyl)biguanide
1-(2,5-dichlorophenyl)biguanide
1-(2,6-dichlorophenyl)biguanide
1-(3,4-dichlorophenyl)biguanide
1-(3,5-dichlorophenyl)biguanide
1-(2,3,4-trichlorophenyl)biguanide
1-(2,3,5-trichlorophenyl)biguanide
1-(2,3,6-trichlorophenyl)biguanide
1-(2,4,5-trichlorophenyl)biguanide
1-(2,4,6-trichlorophenyl)biguanide
1-(3,4,5-trichlorophenyl)biguanide
1-(p-bromophenyl)biguanide
1-(p-fluorophenyl)biguanide
1-(m-fluorophenyl)biguanide
1-(p-fluorophenyl)biguanide
1-(p-iodophenyl)biguanide
1-(p-methylphenyl)biguanide
1-(p-nitrophenyl)biguanide
1-(p-aminophenyl)biguanide
1-(p-acetylaminophenyl)biguanide
1-(p-methylaminophenyl)biguanide
1-(p-dimethylaminophenyl)biguanide
1-(p-cyanophenyl)biguanide
1-(o-trifluoromethylphenyl)biguanide
1-(m-trifluoromethylphenyl)biguanide
1-(p-trifluoromethylphenyl)biguanide
1-(p-trifluoromethoxyphenyl)biguanide
1-(p-methoxyphenyl)biguanide
1-(p-hydroxyphenyl)biguanide
1-(p-carboxyphenyl)biguanide
1-(p-carbethoxyphenyl)biguanide
1-(p-sulfonamidophenyl)biguanide
1-(p-dimethylsulfonamidophenyl)biguanide
1-(p-trifluoroacetylphenyl)biguanide
1-(p-trifluoromethylsulfonylphenyl)biguanide
1-(p-di-trifluoromethylsulfonamidophenyl)biguanide
1-(p-phenoxyphenyl)biguanide
1-(p-[p'-chlorophenoxy]phenyl)biguanide
1-(p-acetyloxyphenyl)biguanide
1-(p-biphenylylphenyl)biguanide
1-(p-[4'-chlorobiphenyl]phenyl)biguanide
1-(p-acetylphenyl)biguanide
1-(p-mercaptophenyl)biguanide
1-(p-methylthiophenyl)biguanide
1-(p-methylsulfinylphenyl)biguanide
1-(p-methylsulfonylphenyl)biguanide
1-(p-acetylthiophenyl)biguanide
1-(p-thiocyanatophenyl)biguanide
1-(2,3-difluorophenyl)biguanide
1-(2,4-difluorophenyl)biguanide
1-(2,5-difluorophenyl)biguanide
1-(2,6-difluorophenyl)biguanide
1-(3,4-difluorophenyl)biguanide
1-(3,5-difluorophenyl)biguanide
1-(2-cyano-4-chlorophenyl)biguanide
1-(2-trifluoromethyl-4-fluorophenyl)biguanide
1-(2-trifluoromethyl-4-chlorophenyl)biguanide
1-(2-trifluoromethyl-4-bromophenyl)biguanide
1-(2-trifluoromethyl-4-nitrophenyl)biguanide
1-(3-trifluoromethyl-4-fluorophenyl)biguanide
1-(3-trifluoromethyl-4-chlorophenyl)biguanide
1-(3-trifluoromethyl-4-bromophenyl)biguanide
1-(3-trifluoromethyl-4-nitrophenyl)biguanide
1-(4-trifluoromethyl-2-fluorophenyl)biguanide
1-(4-trifluoromethyl-2-chlorophenyl)biguanide
1-(4-trifluoromethyl-2-bromophenyl)biguanide
1-(4-trifluoromethyl-2-nitrophenyl)biguanide
1-(4-trifluoromethyl-3-fluorophenyl)biguanide
1-(4-trifluoromethyl-3-chlorophenyl)biguanide
1-(4-trifluoromethyl-3-bromophenyl)biguanide
1-(4-trifluoromethyl-3-nitrophenyl)biguanide
1-(2-fluoro-5-trifluoromethylphenyl)biguanide
1-(2-chloro-5-trifluoromethylphenyl)biguanide
1-(2-bromo-5-trifluoromethylphenyl)biguanide
1-(2-nitro-5-trifluoromethylphenyl)biguanide
1-(2-fluoro-4-chlorophenyl)biguanide
1-(2-chloro-4-fluorophenyl)biguanide
1-(2-chloro-6-fluorophenyl)biguanide
1-(2,3-dibromophenyl)biguanide
1-(2,5-dibromophenyl)biguanide
1-(2,6-dibromophenyl)biguanide
1-(2,3,5,6-tetrafluorophenyl)biguanide
1-(2,3,4,5,6-pentafluorophenyl)biguanide
1-(2,6-dichloro-4-bromophenyl)biguanide
1-(2,6-dichloro-4-fluorophenyl)biguanide
1-(2,6-dichloro-4-iodophenyl)biguanide
1-(2,6-dichloro-4-nitrophenyl)biguanide
1-(2,6-dichloro-4-trifluoromethylphenyl)biguanide
1-(2,4-dichloro-6-bromophenyl)biguanide
1-(2-trifluoromethyl-4-aminophenyl)biguanide
1-(2-trifluoromethyl-4-acetylaminophenyl)biguanide
1-(4-amino-3-trifluoromethylphenyl)biguanide
1-(4-dimethylamino-3-trifluoromethylphenyl)biguanide 1-(3,5-ditrifluoromethylphenyl)biguanide
1-(4-hydroxy-3-trifluoromethylphenyl)biguanide
1-(2,4-dinitrophenyl)biguanide
1-(4-methoxy-3-trifluoromethylphenyl)biguanide
1-(3-trifluoromethyl-4-methoxyphenyl)biguanide

PRODUCTS 2-amino-6-ethyl-4-anilino-1,3,5-triazine
2-amino-6-ethyl-4-(o-chloroanilino)-1,3,5-triazine
2-amino-6-ethyl-4-(m-chloroanilino)-1,3,5-triazine
2-amino-6-ethyl-4-(p-chloroanilino)-1,3,5-triazine
2-amino-6-ethyl-4-(2,3-dichloroanilino)-1,3,5-triazine
2-amino-6-ethyl-4-(2,4-dichloroanilino)-1,3,5-triazine
2-amino-6-ethyl-4-(2,5-dichloroanilino)-1,3,5-triazine
2-amino-6-ethyl-4-(2,6-dichloroanilino)-1,3,5-triazine
2-amino-6-ethyl-4-(3,4-dichloroanilino)-1,3,5-triazine
2-amino-6-ethyl-4-(3,5-dichloroanilino)-1,3,5-triazine
2-amino-6-ethyl-4-(2,3,4-trichloroanilino)-1,3,5-triazine
2-amino-6-ethyl-4-(2,3,5-trichloroanilino)-1,3,5-triazine
2-amino-6-ethyl-4-(2,3,6-trichloroanilino)-1,3,5-triazine
2-amino-6-ethyl-4-(2,4,5-trichloroanilino)-1,3,5-triazine
2-amino-6-ethyl-4-(2,4,6-trichloroanilino)-1,3,5-triazine
2-amino-6-ethyl-4-(3,4,5-trichloroanilino)-1,3,5-triazine
2-amino-6-ethyl-4-(p-bromoanilino)-1,3,5-triazine
2-amino-6-ethyl-4-(o-fluoroanilino)-1,3,5-triazine
2-amino-6-ethyl-4-(m-fluoroanilino)-1,3,5-triazine
2-amino-6-ethyl-4-(p-fluoroanilino)-1,3,5-triazine
2-amino-6-ethyl-4-(p-iodoanilino)-1,3,5-triazine
2-amino-6-ethyl-4-(p-methylanilino)-1,3,5-triazine
2-amino-6-ethyl-4-(p-nitroanilino)-1,3,5-triazine
2-amino-6-ethyl-4-(p-aminoanilino)-1,3,5-triazine
2-amino-6-ethyl-4-(p-acetylaminoanilino)-1,3,5-triazine
2-amino-6-ethyl-4-(p-methylaminoanilino)-1,3,5-triazine
2-amino-6-ethyl-4-(p-dimethylaminoanilino)-1,3,5-triazine
2-amino-6-ethyl-4-(p-cyanoanilino)-1,3,5-triazine
2-amino-6-ethyl-4-(o-trifluoromethylanilino)-1,3,5-triazine
2-amino-6-ethyl-4-(m-trifluoromethylanilino)-1,3,5-triazine
2-amino-6-methyl-4-(p-trifluoromethylanilino)-1,3,5-triazine
2-amino-6-ethyl-4-(p-trifluoromethoxyanilino)-1,3,5-triazine
2-amino-6-ethyl-4-(p-methoxyanilino)-1,3,5-triazine
2-amino-6-ethyl-4-(p-hydroxyanilino)-1,3,5-triazine
2-amino-6-ethyl-4-(p-carboxyanilino)-1,3,5-triazine
2-amino-6-ethyl-4-(p-carbethoxyanilino)-1,3,5-triazine
2-amino-6-ethyl-4-(p-sulfonamidoanilino)-1,3,5-triazine
2-amino-6-ethyl-4-(p-dimethylsulfonamidoanilino)-1,3,5-triazine
2-amino-6-ethyl-4-(p-trifluoroacetylanilino)-1,3,5-triazine
2-amino-6-ethyl-4-(p-trifluoromethylsulfonylanilino)-1,3,5-triazine
2-amino-6-ethyl-4-(p-di-trifluoromethylsulfonamidoanilino)-1,3,5-triazine
2-amino-6-ethyl-4-(p-phenoxyanilino)-1,3,5-triazine
2-amino-6-ethyl-4-(p-[p'-chlorophenoxy]anilino)1,3,5-triazine
2-amino-6-ethyl-4-(p-acetyloxyanilino)-1,3,5-triazine
2-amino-6-ethyl-4-(p-biphenylylanilino)-1,3,5-triazine
2-amino-6-ethyl-4-(p-[4'-chlorobiphenylyl]anilino)-1,3,5-triazine
2-amino-6-ethyl-4-(p-acetylanilino)-1,3,5-triazine
2-amino-6-ethyl-4-(p-mercaptoanilino)-1,3,5-triazine
2-amino-6-ethyl-4-(p-methylthioanilino)-1,3,5-triazine
2-amino-6-ethyl-4-(p-methylsulfinylanilino)-1,3,5-triazine
2-amino-6-ethyl-4-(p-methylsulfonylanilino)-1,3,5-triazine
2-amino-6-ethyl-4-(p-acetylthioanilino)-1,3,5-triazine
2-amino-6-ethyl-4-(p-thiocyanatoanilino)-1,3,5-triazine
2-amino-6-ethyl-4-(2,3-difluoroanilino)-1,3,5-triazine
2-amino-6-ethyl-4-(2,4-difluoroanilino)-1,3,5-triazine
2-amino-6-ethyl-4-(2,5-difluoroanilino)-1,3,5-triazine
2-amino-6-ethyl-4-(2,6-difluoroanilino)-1,3,5-triazine
2-amino-6-ethyl-4-(3,4-difluoroanilino)-1,3,5-triazine
2-amino-6-ethyl-4-(3,5-difluoroanilino)-1,3,5-triazine
2-amino-6-ethyl-4-(2-cyano-4-chloroanilino)-1,3,5-triazine
2-amino-6-ethyl-4-(2-trifluoromethyl-4-fluoroanilino)-1,3,5-triazine
2-amino-6-ethyl-4-(2-trifluoromethyl-4-chloroanilino)-1,3,5-triazine
2-amino-6-ethyl-4-(2-trifluoromethyl-4-bromoanilino)-1,3,5-triazine
2-amino-6-ethyl-4-(2-trifluoromethyl-4-nitroanilino)-1,3,5-triazine
2-amino-6-ethyl-4-(3-trifluoromethyl-3-fluoroanilino)-1,3,5-triazine
2-amino-6-ethyl-4-(3-trifluoromethyl-4-fluoroanilino)-1,3,5-triazine
2-amino-6-ethyl-4-(3-trifluoromethyl-4-bromoanilino)-1,3,5-triazine
2-amino-6-ethyl-4-(3-trifluoromethyl-4-nitroanilino)-1,3,5-triazine
2-amino-6-ethyl-4-(4-trifluoromethyl-2-fluoroanilino)-1,3,5-triazine
2-amino-6-ethyl-4-(4-trifluoromethyl-2-chloroanilino)-1,3,5-triazine
2-amino-6-ethyl-4-(4-trifluoromethyl-2-bromoanilino)-1,3,5-triazine
2-amino-6-ethyl-4-(4-trifluoromethyl-2-nitroanilino)-1,3,5-triazine
2-amino-6-ethyl-4-(4-trifluoromethyl-3-fluoroanilino)-1,3,5-triazine
2-amino-6-ethyl-4-(4-trifluoromethyl-3-chloroanilino)-1,3,5-triazine
2-amino-6-ethyl-4-(4-trifluoromethyl-3-bromoanilino)-1,3,5-triazine
2-amino-6-ethyl-4-(4-trifluoromethyl-3-nitroanilino)-1,3,5-triazine
2-amino-6-ethyl-4-(2-fluoro-5-trifluoromethylanilino)-1,3,5-triazine
2-amino-6-ethyl-4-(2-chloro-5-trifluoromethylanilino)-1,3,5-triazine
2-amino-6-ethyl-4-(2-bromo-5-trifluoromethylanilino)-1,3,5-triazine
2-amino-6-ethyl-4-(2-nitro-5-trifluoromethylanilino)-1,3,5-triazine
2-amino-6-ethyl-4-(2-fluoro-4-chloroanilino)-1,3,5-triazine
2-amino-6-ethyl-4-(2-chloro-4-fluoroanilino)-1,3,5-triazine
2-amino-6-ethyl-4-(2-chloro-6-fluoroanilino)-1,3,5-triazine
2-amino-6-ethyl-4-(2,3-dibromoanilino)-1,3,5-triazine
2-amino-6-ethyl-4-(2,5-dibromoanilino)-1,3,5-triazine
2-amino-6-ethyl-4-(2,6-dibromoanilino)-1,3,5-triazine
2-amino-6-ethyl-4-(2,3,5,6-tetrafluoroanilino)-1,3,5-triazine
2-amino-6-ethyl-4-(2,3,4,5,6-pentafluoroanilino)-1,3,5-triazine
2-amino-6-ethyl-4-(2,6-dichloro-4-bromoanilino)-1,3,5-triazine
2-amino-6-ethyl-4-(2,6-dichloro-4-fluoroanilino)-1,3,5-triazine
2-amino-6-ethyl-4-(2,6-dichloro-4-iodoanilino)-1,3,5-triazine
2-amino-6-ethyl-4-(2,6-dichloro-4-nitroanilino)-1,3,5-triazine
2-amino-6-ethyl-4-(2,6-dichloro-4-trifluoromethylanilino)-1,3,5-triazine
2-amino-6-ethyl-4-(2,4-dichloro-6-bromoanilino)-1,3,5-triazine
2-amino-6-ethyl-4-(2-trifluoromethyl-4-aminoanilino)-1,3,5-triazine 2-amino-6-ethyl-4-(2-trifluoromethyl-4-acetylamino-
anilino)-1,3,5-triazine
2-amino-6-ethyl-4-(4-amino-3-trifluoromethylanilino)-
1,3,5-triazine
2-amino-6-ethyl-4-(4-dimethylamino-3-trifluoromethyl-
anilino)-1,3,5-triazine
2-amino-6-ethyl-4-(3,5-ditrifluoromethylanilino)-1,3,5-
triazine
2-amino-6-ethyl-4-(4-hydroxy-3-trifluoromethylanilino)-
1,3,5-triazine
2-amino-6-ethyl-4-(2,4-dinitroanilino)-1,3,5-triazine
2-amino-6-ethyl-4-(4-methoxy-3-trifluoromethylanilino)-
1,3,5-triazine
2-amino-6-ethyl-4-(3-trifluoromethyl-4-methoxyanilino)-
1,3,5-triazine

EXAMPLE 3

When the condensation of Example 1 is followed and the acid ester is selected from Table I, Example 1 and the biguanide starting material is selected from Example 2, then the corresponding product is prepared.

EXAMPLE 4

When the procedure of Example 1 is followed and the reactants of Table I below are used in place of ethylacetate, then the corresponding product of Table II below is prepared.

TABLE I acetic acid chloride           phenylacetic anhydride
N,N-diethylacetamide           cyclopropylacetic acid chloride
propionic anhydride            allylacetic acid chloride
butyric anhydride              trifluoroacetic anhydride
cyclopropionic anhydride       methoxyacetic acid bromide

TABLE II 2-acetylamino-6-methyl-4-(p-trifluoromethylanilino)-
1,3,5-triazine
2-propionamido-6-propyl-4-(p-trifluoromethylanilino)-
1,3,5-triazine
2-butyramido-6-butyl-4-(p-trifluoromethylanilino)-1,3,5-
triazine
2-cyclopropionamido-6-cyclopropyl-4-(p-trifluoromethyl-
anilino)-1,3,5-triazine
2-phenylacetylamino-6-benzyl-4-(p-trifluoromethyl-
anilino)-1,3,5-triazine
2-cyclopropylacetylamino-6-cyclopropylmethyl-4-(p-
trifluoromethylanilino)-1,3,5-triazine
2-allylacetylamino-6-(4-pentenyl)-4-(p-trifluoromethyl-
anilino)-1,3,5-triazine
2-trifluoroacetylamino-6-trifluoromethyl-4-(p-trifluoro-
methylanilino)-1,3,5-triazine
2-methoxyacetylamino-6-ethoxy-4-(p-trifluoromethyl-
anilino)-1,3,5-triazine

EXAMPLE 5

When the procedure of Example 1 is followed using the reactants of Table I, Example 4 and the biguanide starting materials of Example 2, then the corresponding product is obtained.

I claim:
1. A compound of the formula

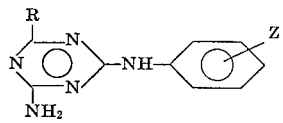

where:
Z is fluoro and R is loweralkyl.
2. A compound according to claim 1 where:
Z is o-fluoro and R is methyl thus forming 2-amino-6-methyl-4-(o-fluoroanilino)-1,3,5-triazine.
3. A compound according to claim 1 where:
Z is m-fluoro and R is methyl thus forming 2-amino-6-methyl-4-(m-fluoroanilino)-1,3,5-triazine.
4. A compound according to claim 1 where:
Z is p-fluoro and R is methyl thus forming 2-amino-6-methyl-4-(p-fluoroanilino)-1,3,5-triazine.
5. A compound of the formula

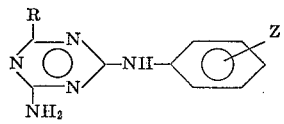

where:
Z is trifluoromethyl and R is loweralkyl.
6. A compound according to claim 5 where:
Z is o-trifluoromethyl and R is methyl thus forming 2 - amino-6-methyl-4-(o-trifluoromethylanilino)-1,3,5-triazine.
7. A compound according to claim 5 where:
Z is m-trifluoromethyl and R is methyl thus forming 2 - amino-6-methyl-4-(m-trifluoromethylanilino)-1,3,5-triazine.
8. A compound according to claim 5 where:
Z is p-trifluoromethyl and R is methyl thus forming 2-amino - 6 - methyl-4-(p-trifluoromethylanilino)-1,3,5-triazine.
9. A compound according to claim 5 where:
Z is p-trifluoromethyl and R is ethyl thus forming 2 - amino-6-ethyl-4-(p-trifluoromethylanilino)-1,3,5-triazine.
10. A compound according to claim 5 where:
Z is p-trifluoromethyl and R is propyl thus forming 2 - amino-6-propyl-4-(p-trifluoromethylanilino)-1,3,5-triazine.
11. A compound according to claim 5 where:
Z is p-trifluoromethyl and R is i-propyl thus forming 2 - amino-6-i-propyl-4-(p-trifluoromethylanilino)-1,3,5-triazine.
12. A compound according to claim 5 where:
Z is p-trifluoromethyl and R is butyl thus forming 2-amino - 6 - butyl-4-(p-trifluoromethylanilino)-1,3,5-triazine.
13. A compound according to claim 5 where:
Z is p-trifluoromethyl and R is pentyl thus forming 2 - amino-6-pentyl-4-(p-trifluoromethylanilino)-1,3,5-triazine.
14. A compound according to claim 5 where:
Z is p-trifluoromethyl and R is hexyl thus forming 2-amino - 6 - hexyl-4-(p-trifluoromethylanilino)-1,3,5-triazine.
15. A compound of the formula

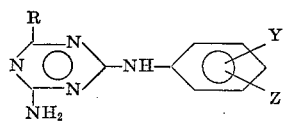

where:
Y is fluoro, Z is bromo and R is loweralkyl.
16. A compound of the formula

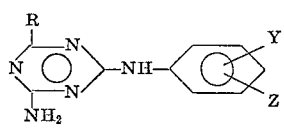

where:
Y is chloro, Z is bromo and R is loweralkyl.
17. A compound according to claim 16 where:
Y is 2-chloro, Z is 4-bromo and R is methyl thus forming 2-amino-6-methyl-4-(2-chloro-4 - bromoanilino)-1,3,5-triazine.
18. A compound according to claim 16 where:
Y is 4-chloro, Z is 2-bromo and R is methyl thus forming 2 - amino-6-methyl-4-(2-bromo-4-chloroanilino)-1,3,5-triazine.

19. A compound of the formula

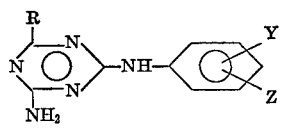

where:
Y is bromo, Z is bromo and R is loweralkyl.

20. A compound according to claim 19 where:
Y is 2-bromo, Z is 4-bromo and R is methyl thus forming 2-amino-6-methyl-4-(2,4-dibromoanilino) - 1,3,5-triazine.

21. A compound according to claim 19 where:
Y is 2-bromo, Z is 6-bromo and R is methyl thus forming 2-amino-6-methyl-4-(2,6-dibromoanilino) - 1,3,5-triazine.

22. A compound of the formula

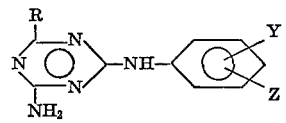

where:
Y is trifluoromethyl, Z is bromo and R is loweralkyl.

23. A compound according to claim 22 where:
Y is 2-trifluoromethyl, Z is 4-bromo and R is methyl thus forming 2-amino-6-methyl-4-(2-trifluoromethyl-4-bromoanilino)-1,3,5-triazine.

24. A compound according to claim 22 where:
Y is 3-trifluoromethyl, Z is 4-bromo and R is methyl thus forming 2-amino-6-methyl-4-(3-trifluoromethyl-4-bromoanilino)-1,3,5-triazine.

25. A compound according to claim 22 where:
Y is 4-trifluoromethyl, Z is 2-bromo and R is methyl thus forming 2-amino-6-methyl-4-(2-bromo-4-trifluoromethylanilino)-1,3,5-triazine.

26. A compound according to claim 22 where:
Y is 4-trifluoromethyl, Z is 3-bromo and R is methyl thus forming 2-amino-6-methyl-4-(3-bromo-4-trifluoromethylanilino)-1,3,5-triazine.

27. A compound according to claim 22 where:
Y is 5-trifluoromethyl, Z is 2-bromo and R is methyl thus forming 2-amino-6-methyl-4-(2-bromo-5-trifluoromethylanilino)-1,3,5-triazine.

28. A compound of the formula

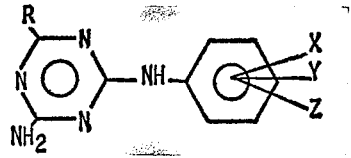

where:
X is chloro, Y is fluoro, Z is bromo and R is loweralkyl.

29. A compound of the formula

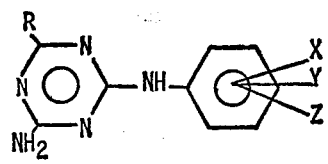

where:
X is chloro, Y is chloro, Z is bromo and R is loweralkyl.

30. A compound according to claim 29 where:
X is 2-chloro, Y is 6-chloro, Z is 4-bromo and R is methyl thus forming 2-amino-6-methyl-4-(2,6-dichloro-4-bromoanilino)-1,3,5-triazine.

31. A compound according to claim 29 where:
X is 2-chloro, Y is 4-chloro, Z is 6-bromo and R is methyl thus forming 2-amino-6-methyl-4-(2,4-dichloro-6-bromoanilino)-1,3,5-triazine.

32. A compound of the formula

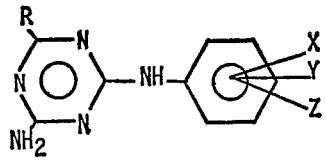

where:
X is chloro, Y is bromo, Z is bromo and R is loweralkyl.

33. A compound according to claim 32 where:
X is 2-chloro, Y is 4-bromo, Z is 6-bromo and R is methyl thus forming 2-amino-6-methyl-4-(2-chloro-4,6-dibromoanilino)-1,3,5-triazine.

34. A compound according to claim 32 where:
X is 4-chloro, Y is 2-bromo, Z is 6-bromo and R is methyl thus forming 2-amino-6-methyl-4-(2,6-dibromo-4-chloroanilino)-1,3,5-triazine.

35. A compound of the formula

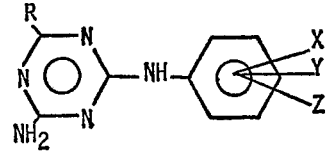

where:
X is chloro, Y is trifluoromethyl, Z is bromo and R is loweralkyl.

36. A compound of the formula

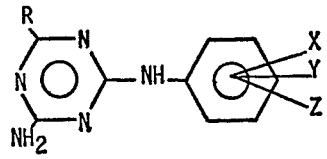

where:
X is bromo, Y is fluoro, Z is bromo and R is loweralkyl.

37. A compound of the formula

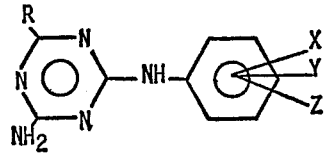

where:
X is bromo, Y is bromo, Z is bromo and R is loweralkyl.

38. A compound of the formula

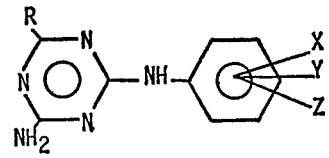

where:
X is bromo, Y is trifluoromethyl, Z is bromo and R is loweralkyl.

39. A compound of the formula

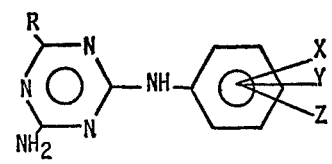

where:
X is chloro, Y is fluoro, Z is chloro and R is loweralkyl.

40. A compound according to claim 39 where:
X is 2-chloro, Y is 4-chloro, Z is 6-bromo and R is methyl thus forming 2-amino-6-methyl-4-(2,4-dichloro-6-bromoanilino)-1,3,5-triazine.

41. A compound according to claim 39 where:
X is 2-chloro, Y is 6-chloro, Z is 4-bromo and R is methyl thus forming 2-amino-6-methyl-4-(2,6-dichloro-4-bromoanilino)-1,3,5-triazine.

42. A compound of the formula

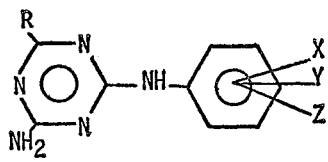

where:
X is chloro, Y is chloro, Z is chloro and R is loweralkyl.

43. A compound according to claim 42 where:
X is 2-chloro, Y is 4-chloro, Z is 6-chloro and R is methyl thus forming 2-amino-6-methyl-4-(2,4,6-trichloroanilino)-1,3,5-triazine.

44. A compound according to claim 42 where:
X is 2-chloro, Y is 4-chloro, Z is 6-chloro and R is ethyl thus forming 2-amino-6-ethyl-4-(2,4,6-trichloroanilino)-1,3,5-triazine.

45. A compound according to claim 42 where:
X is 2-chloro, Y is 4-chloro, Z is 6-chloro and R is propyl thus forming 2-amino-6-propyl-4-(2,4,6-trichloroanilino)-1,3,5-triazine.

46. A compound according to claim 42 where:
X is 2-chloro, Y is 4-chloro, Z is 6-chloro and R is i-propyl thus forming 2-amino-6-i-propyl-4-(2,4,6-trichloroanilino)-1,3,5-triazine.

47. A compound according to claim 42 where:
X is 2-chloro, Y is 4-chloro, Z is 6-chloro and R is butyl thus forming 2-amino-6-butyl-4-(2,4,6-trichloroanilino)-1,3,5-triazine.

48. A compound according to claim 42 where:
X is 2-chloro, Y is 4-chloro, Z is 6-chloro and R is pentyl thus forming 2-amino-6-pentyl-4-(2,4,6-trichloroanilino)-1,3,5-triazine.

49. A compound according to claim 42 where:
X is 2-chloro, Y is 4-chloro, Z is 6-chloro and R is hexyl thus forming 2-amino-6-hexyl-4-(2,4,6-trichloroanilino)-1,3,5-triazine.

50. A compound of the formula

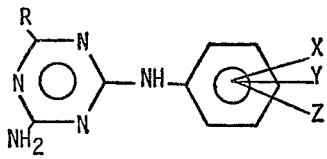

where:
X is chloro, Y is trifluoromethyl, Z is chloro and R is loweralkyl.

References Cited
UNITED STATES PATENTS

| | | | |
|---|---|---|---|
| 2,305,217 | 12/1942 | Durant | 260—249.9 X |
| 2,777,848 | 1/1957 | Schaefer | 260—249.9 |
| 3,397,205 | 8/1968 | Luethi et al. | 260—249.9 X |

JOHN M. FORD, Primary Examiner

U.S. Cl. X.R.

260—565; 424—249